United States Patent [19]

Fernyhough et al.

[11] Patent Number: 4,725,637

[45] Date of Patent: Feb. 16, 1988

[54] PROCESS FOR THE PRODUCTION OF A THERMOPLASTIC ELASTOMER COMPOSITION

[75] Inventors: Alan Fernyhough, Kingston Upon Thames; Sidney G. Fogg, Ashtead, both of England

[73] Assignee: BP Chemicals Limited, London, England

[21] Appl. No.: 853,621

[22] Filed: Apr. 18, 1986

[30] Foreign Application Priority Data

Apr. 24, 1985 [GB] United Kingdom ............... 8510392

[51] Int. Cl.$^4$ .................. C08L 23/26; C08L 31/04; C08L 35/04
[52] U.S. Cl. .................................. 524/271; 524/522; 524/524; 525/194; 525/57; 525/221; 525/222; 525/231; 525/233
[58] Field of Search .............. 525/233, 194, 222, 221, 525/231, 57; 524/271

[56] References Cited

U.S. PATENT DOCUMENTS

| | | | |
|---|---|---|---|
| 3,037,954 | 6/1962 | Gessler et al. | 260/29.8 |
| 3,758,643 | 9/1973 | Fischer | 525/240 |
| 3,873,494 | 3/1975 | Lewis | 260/42.37 |
| 4,104,210 | 8/1978 | Coran et al. | 260/4 R |
| 4,299,931 | 11/1981 | Coran et al. | 525/194 |
| 4,340,684 | 7/1982 | Bohm et al. | 525/194 |
| 4,409,365 | 10/1983 | Coran et al. | 525/78 |
| 4,591,615 | 5/1986 | Aldred et al. | 525/179 |

FOREIGN PATENT DOCUMENTS

| | | |
|---|---|---|
| 2450851 | 10/1980 | France . |
| 53-063453 | 6/1978 | Japan . |
| 55-048236 | 4/1980 | Japan . |
| 56-155213 | 12/1981 | Japan . |
| 2028837 | 3/1980 | United Kingdom . |
| 2123837 | 2/1984 | United Kingdom . |

OTHER PUBLICATIONS

Coran et al.-"Rubber-Thermoplastic Compositions, Part I . . . " 53 Rubber Chem. & Tech. 141-150 (1980).
Coran et al.-"Rubber-Thermoplastic Compositions, Part II. . . " 53 Rubber Chem. & Tech. 781-794 (1980).
Coran et al.-"Rubber-Thermoplastic Compositions, Part III . . . " 54 Rubber Chem. & Tech. 91-100 (1981).

*Primary Examiner*—Carman J. Seccuro
*Attorney, Agent, or Firm*—Brooks Haidt Haffner & Delahunty

[57] ABSTRACT

A process for producing a thermoplastic elastomer comprising dynamically curing with a peroxy curing agent (A) nitrile rubber and (B) homopolymer or copolymer of ethylene, which is curable with the peroxy curing agent but excluding copolymers comprising ethylene and an acrylic or methacrylic ester. The thermoplastic elastomer composition produced by the process is suitable for use in sealant or adhesive compositions, particularly when blended with a tackifying resin.

14 Claims, No Drawings

PROCESS FOR THE PRODUCTION OF A THERMOPLASTIC ELASTOMER COMPOSITION

The present invention relates to a process for producing a thermoplastic elastomer composition and to the composition produced by the process. In particular the invention relates to a process for producing thermoplastic elastomer compositions which are suitable for use in sealant or adhesive compositions.

Thermoplastic elastomers i.e. elastomeric materials which are capable of being fabricated, including being reprocessed, by techniques conventionally associated with thermoplastic materials, are known. For example, U.S. Pat. No. 3,037,954 discloses a process for preparing a thermoplastic vulcanised blend of crystalline polypropylene and rubbery polymers, particularly chlorinated rubbers but also including butadiene acrylonitrile rubbers. The process, which is known as "dynamic curing" comprises mixing together the polypropylene and the vulcanized rubber with a curing agent, which is not a peroxide catalyst, and curing the mixture at a temperature of 225° to 350° F. (107° to 177° C.) while thoroughly mixing the composition.

Thermoplastic elastomeric compounds prepared by dynamically curing blends of EPDM rubber and polypropylene and blends of nitrile rubber and nylon are disclosed in two papers by A.Y. Coran and R. Patel published in Rubber Chemistry and Technology volume 53 (1980) "Rubber-Thermoplastic Compositions. Part 1. EPDM-Polypropylene Thermoplastic Vulcanisates" pages 141 to 150 and "Rubber-Thermoplastic compositions. Part II. NBR-Nylon Thermoplastic Elastomeric Compositions" pages 781 to 794.

The known thermoplastic elastomers are believed to comprise domains of cross-linked rubber dispersed in a thermoplastic. There is apparently no reaction between the thermoplastic and the rubber or curing agent.

It has now been found that thermoplastic elastomers may be prepared from nitrile rubber and certain thermoplastics in which compositions both the rubber and the thermoplastic are cross-linkage by a peroxy curing agent. Such thermoplastic elastomers may be suitable for use in sealant or adhesive compositions.

According to the present invention a process for producing a thermoplastic elastomer comprises curing a blend of nitrile rubber and a thermoplastic under dynamic curing conditions characterised in that the blend comprises (A) a nitrile rubber, (B) a peroxy curing agent and (C) a homopolymer or copolymer of ethylene, which is curable with the peroxy curing agent, but excluding copolymers comprising ethylene and an acrylic or methacrylic ester, and in that the blend is cured by mixing at a temperature above the activation temperature of the peroxy curing agent and above the melting temperature of the ethylene polymer.

The invention includes a thermoplastic elastomer composition obtainable by the process as hereinbefore defined.

Nitrile rubbers are known copolymers of a diene and an unsaturated nitrile for example isoprene-acrylonitrile copolymer and butadiene-acrylonitrile. In the present invention a preferred nitrile rubber is butadiene-acrylonitrile copolymer. Preferably the nitrile rubber, e.g. a butadiene-acrylonitrile copolymer, has an acrylonitrile content of from 20 to 45% by weight. A mixture of two or more nitrile rubbers may be used. For example, a low molecular weight nitrile rubber, which is liquid at 20° C. may be used together with a second nitrile rubber which is solid at 20° C. The use of a liquid rubber imparts to the final product good hot flow and wetting properties and tends to produce a comparatively softer product.

Peroxy-curable thermoplastics suitable for use in the present invention include polyethylene, copolymers of ethylene and another alpha-olefin (e.g. LLDPE), ethylene-vinyl acetate copolymers, hydrolysed or partially hydrolysed ethylene-vinyl acetate copolymers, ethylene-vinyl ether copolymers, ethylene-acrylic acid copolymers and mixtures thereof. The hydrolysed or partially hydrolysed ethylene-vinyl acetate copolymers preferably have a relatively low -OH content. Copolymers of ethylene and vinyl acetate are preferred.

Ethylene-vinyl acetate copolymers are known and some are commercially available. They can be made by conventional and well known methods. For use in the present invention, the ethylene-vinyl acetate copolymer preferably has from 15 to 80% by weight of vinyl acetate and a melt flow index of from 2 to 600. An ethylene-vinyl acetate copolymer having a high melt flow index will tend to produce a composition having a relatively low hot viscosity, whereas a copolymer having a high vinyl acetate content will tend to produce softer, more flexible compositions. Two or more ethylene-vinyl acetate copolymers can be used to produce a balance of properties.

Peroxy curing agents are known and include, for example, dicumyl peroxide; 1,1-di-tertiary butyl peroxy-3,3,5-trimethyl cyclohexane; di-tertiary butyl peroxide; 2,5-dimethyl-2,5-bis (tertiary butyl peroxy) hexane; tertiary butyl cumyl peroxide; bis(tertiary butyl peroxy isopropyl) benzene; tertiary butyl peroxy benzoate and 4,4-di-tertiary butyl peroxy n-butyl valerate. Also suitable for use in the present invention are bis-peroxycarbamates as described, for example, by Dr. A. H. Verlag in Kunstoffe, 37(1984) "Bisperoxycarbamates as Vulcanising Agents for Rubber" pages 390 to 397. The peroxy curing agent may be supported on an inert carrier such as, for example, precipitated calcium carbonate, silica or Kieselguhr. Peroxy curing agents which have an activation temperature above 100° C. but below 150° C., e.g. tertiary butyl peroxy benzoate, have been found to be particularly suitable for use in the process according to the present invention, especially when the nitrile rubber component comprises a mixture of liquid and solid nitrile rubbers.

The ratio of nitrile rubber to the ethylene-vinyl acetate copolymer is preferably from 1:5 to 4:1 parts by weight more preferably 1:2 to 2:1. The amount of peroxy curing agent is preferably from 0.4 to 4% by weight based on the total weight of the nitrile rubber and ethylene-vinyl acetate copolymer.

Preferably, the amount of peroxy curing agent used is such that it is substantially all reacted during the dynamic curing stage of the process so that no further curing occurs during subsequent processing or use of the composition. The actual amount of peroxy curing agent required for any particular blend will depend inter alia on the components of the blend, the curing agent used and the curing conditions and can be determined by simple trail and error experiments e.g. using small scale preparations (about 70 g) of dynamically cured compositions in the absence of tackifying resins and waxes in a Brabender Plasticorder. When a thermoplastic elastomer composition according to the present invention is to be used in a sealant or adhesive composition, the amount of crosslinking agent used is preferably such that the maximum Brabender torque, which corresponds to the end of dynamic crosslinking, does not rise above 2000 meter-grams and more preferably does-not rise above 1000 meter-grams at a rotor speed of 100 to 120 rpm and a compound temperature greater than 130° C.

The applicants have found that thermoplastic elastomer compositions comprising nitrile rubber and ethylene-containing polymers are particularly suitable for use in sealant and adhesive compositions, particularly when they are blended with a tackifying resin.

Thus, according to the invention, a sealant or adhesive composition comprises (A) a thermoplastic elastomer which thermoplastic elastomer comprises a dynamically cured blend of a nitrile rubber, a peroxy curing agent and a homopolymer or copolymer of ethylene which polymer is curable with the peroxy curing agent and (B) a tackifying resin. The ethylene-containing polymer is preferably a copolymer of ethylene and vinyl acetate.

Tackifying resins are well known for use in sealant and adhesive compositions. For example, tackifying resins and their use in adhesives are described in Handbook of Adhesives edited by I. Skeist second edition, chapter 14, 1977, Van Nostrand Reinhold Company. Any of the known tackifying resins may be used in the sealant compositions according to the present invention. Particularly suitable resins are the hydrogenated rosins and hydrogenated rosin esters such as, for example, glycerol or pentaerythritol esters of hydrogenated rosins. The amount of tackifying resins included in the sealant composition is preferably from 5 to 100 parts by weight per hundred parts of the total weight of the nitrile rubber and ethylene-containing polymer.

Preferably the tackifying resin is blended with the theromplastic elastomer composition produced by dynamically curing the nitrile rubber and the ethylene-containing polymer. Thus, the process for producing a sealant composition according to the present invention preferably comprises curing a blend of nitrile rubber and an ethylene-containing polymer, e.g. an ethylene-vinyl acetate copolymer, under dynamic curing conditions and subsequently blending the composition produced with a tackifying resin.

A sealant or adhesive composition according to the present invention may also contain conventional additives such as, for example, antioxidants, fillers, pigments, softeners and processing aids. In particular compositions may comprise stearic acid as a processing aid, wax to reduce the melt viscosity of the composition and a metallic oxide such as, for example, zinc oxide, magnesia or a lead oxide, e.g. red lead ($Pb_3O_4$) and litharge (PbO) as pigments or stabilisers. However, an oxide such as zinc oxide may cause further undesirable crosslinking of compositions comprising acrylic acid as comonomer.

The compositions according to the present invention may also comprise a polymeric component having hydrolysable silyl groups. When such compositions are exposed to water, preferably in the presence of a silanol condensation catalyst, hydrolysis and condensation of the silyl groups further crosslinks the composition increasing the temperature resistance and stiffness.

The hydrolysable silyl groups can be grafted onto the nitrile rubber or ethylene polymer using known techniques. Alternatively, or in addition, silyl modified polymer may be blended with the composition according to the present invention. Silyl modified polymers are known and can, for example, be prepared by copolymerisation, silane grafting or transesterification techniques. For example, a thermoplastic organic polymer having pendant silane groups can be prepared by copolymerising an unsaturated monomer, such as ethylene, with an unsaturated silane compound having hydrolysable functions, in the presence of a free radical initiator or a Ziegler catalyst. Such copolymerisation techniques are described, for example, in Nos. GB-A-2028831, GB-A-2039513 and GB-A-1415194. Methods for making thermoplastic organic polymer components by the silane-grafting technique are disclosed, for example, in Nos. GB-A-1357549, GB-A-1234034 and GB-A-1286460. A method for making thermoplastic organic polymer components by transesterification is described in No. EP-A-4752.

The components of the compositions according to the present invention may be mixed and cured in conventional rubber mixing equipment. As indicated above sealant compositions according to the present invention are preferably prepared by first dynamically curing the nitrile rubber and ethylene-vinyl acetate copolymer and then blending into the thermoplastic elastomer composition the tackifying resin. Optional additives such as for example pigments, stabilisers, fillers, processing aids and softener are preferably blended into the mixture during the dynamic curing of the nitrile rubber and thermoplastic. A hot flow improver such as wax, if used, is preferably blended into the mixture after curing. Antioxidants may be added before or after the curing stage.

The sealant and adhesive compositions according to the present invention are hot melt sealants, that is they are solid at room temperature (i.e. approximately 20° C.) but become sufficiently fluid at elevated temperatures to "wet" substrates. The composition may be applied using the same or similar techniques to those known for applying hot melt sealants.

The invention is illustrated by the following examples.

EXAMPLE 1

10.5 parts by weight of a commercially available nitrile rubber was charged into a 250 ml Banbury mixer, which had been preheated to 100° C. followed by 4.4 parts by weight of zinc, oxide, 0.9 parts by weight of stearic acid and then 57.9 parts by weight of a mixture of two commercially available ethylene-vinyl acetate copolymers.

The mixture of ethylene-vinyl acetate copolymers comprised 23.7 parts by weight of an ethylene-vinyl acetate copolymer having a vinyl acetate content of 70% and a melt flow index within the range of about 5, sold by Bayer under the trade name LEVAPREN 700 and 34.2 parts by weight of an ethylene-vinyl acetate copolymer, having a vinyl acetate content of 28% and a melt flow index of 400, sold by Esso Chemicals under the trade designation Escorene UL40028. The mixture of the two copolymers provided a balance of properties between the good hot flow properties imparted by the Escorene UL40028 and the relatively good flexibility and extensibility imparted by LEVAPREN 700. (Escorene and LEVAPREN are trade marks).

The nitrile rubber was an acrylonitrile-butadiene copolymer rubber sold by BP Chemicals Limited under the trade name BREON N36C35. (BREON is a registered trade mark). The rubber had a Mooney viscosity ML 1+4 at 100° C. of 35 and contained 36% by weight of bound acrylonitrile. The specific gravity of the rubber was 0.98.

The components were blended together in the Banbury mixer at a rotor speed of approximately 30 rpm for two minutes, followed by 5 minutes at 100 rpm.

31.6 parts by weight of a low molecular weight nitrile rubber sold by BP Chemicals Limited under the trade name BREON NBR 232 was then blended with the other components in the Banbury mixer. This nitrile rubber had a Brookfield viscosity at 50° C. (Spindle No 4) of 23 Pa.s and contained approximately 29% by weight of bound acrylonitrile. The use of this rubber which is liquid at 20° C. with BREON N36 C35 which is solid at 20° C. provided a balance of properties which imparted to the final product good hot flow and wetting characteristics.

The blend was then cured using 1.1 parts by weight of a commercially available peroxy curing agent sold by Akzo Chemie under the trade mark Trigonox C which comprised 95% by weight of tertiary butyl peroxy benzoate. The curing agent was blended with the other components at a temperature below the activation temperature of the curing agent. The temperature of the mixer was then increased to a temperature of approximately 130° C., which is above the activation temperature of the curing agent, and the nitrile rubbers and ethylene-vinyl acetate copolymers were cured while mixing was continued at a rotor speed of 100 rpm for about 20 minutes. During the dynamic curing, the compound temperature rose to 140° C. The heat was then removed and the rotor speed was reduced to 30 rpm. When the compound temperature had fallen to below 100° C., 10.2 parts by weight of a microcrystalline wax was added to and blended with the cured composition. The microcrystalline wax was a commercially available microcrystalline slack wax of low oil content sold by BP Oil under the trade name Micro Slack Wax 70. The wax had a specific gravity at 93.3° C., according to the standard test method I.P.160, within the range of 0.81-0.818 and had a congealing point, as determined by standard test method ATM D938 within the range 65° to 72° C.

The composition as discharged form the Banbury and approximately 75 g of the dynamically cured blend was placed in a Brabender mixer. 17 g of a hydrogenated natural rosin tackifying agent sold by Hercules under the trade mark Staybelite was then blended into the composition at about 100° C.

20 g of the product was moulded for about 3 minutes in a 150 x 150 mm press at 140° C. and 20 tonne pressure. After cooling, the tensile strength, elongation and modulus of the composition, determined according to British Standard 903 Parts A2, were as follows:

Tensile strength
(at yield) 0.38 MPa
(at break) 0.22 MPa.
Elongation:
(at yield) 73%
(at break) 462%.
Tensile Modulus (Stress at 100%) 0.35 MPa.

A sample of the composition was heated to approximately 125° C. and applied to the surface of a block of concrete. While the composition was still hot a second block of concrete was placed on top of the treated surface of the first block and the blocks manually pressed together for about 20 seconds. After cooling to room temperature (approximately 20° C.), it was found that the composition had adhered well to the concrete blocks and had retained good elastic properties. The composition was also found to adhere well to wood.

EXAMPLES 2 TO 5

Example 1 was repeated except that different proportions of the components were used and all the mixing was done in a Brabender mixer.

The solid components were first charged and blended in the mixer and then the liquid nitrile rubber and peroxy curing agent, Trigonox C, were added and blended. The compound temperature was maintained below 100° C., i.e. below the activation temperature of the peroxy curing agent until the blending stage was completed. The circulating oil temperature was then increased to 160° C. and the blend was dynamically crosslinked at a rotor speed of 120 rpm. The Brabender torque, which is proportional to viscosity, decreased at first as the temperature increased. As the temperature continued to rise and the peroxide decomposed, the torque increased to a small peak or plateau and then increased again to a maximum torque. The maximum torque for Example 2 was 650 mg. at 154° C. and for Example 5 was 200 m.g at 135° C. It is believed that this indicates that both the ethylene copolymer and the nitrile rubber were crosslinked.

After forming the thermoplastic elastomer composition, microcrystalline wax and tackifying resin were blended with it. Samples of the composition were compression moulded at 140° C. as in Example 1.

The proportions of the components used as given in Table 1 together with the physical properties of the compositions produced.

The ethylene-vinyl copolymer Escorene UL05540 used was a product supplied by Esso Chemicals which had a vinyl acetate content of 40% by weight and a melt flow index of 55. (ESCORENE is a trade mark).

TABLE 1

| | Examples | | | |
|---|---|---|---|---|
| | 2 | 3 | 4 | 5 |
| Components (amounts, parts by wt) | | | | |
| Nitrile Rubber | | | | |
| BREON N36C35 | 14.0 | 10.8 | 11.1 | 10.9 |
| BREON NBR 232 | 27.7 | 44.3 | 42.4 | 43.6 |
| Ethylene-vinyl acetate | | | | |
| LEVAPREN 700 | 58.3 | 44.9 | — | — |
| UL 40028 | — | — | 46.5 | — |
| UL 05540 | — | — | — | 45.5 |
| Zinc Oxide | 4.4 | 3.4 | 3.5 | 3.5 |
| Stearic Acid | 0.9 | 0.7 | 0.7 | 0.7 |
| Peroxy curing agent - TRIGONOX C | 1.0 | 1.3 | 1.3 | 1.2 |
| Microcrystalline wax | 9.0 | 8.9 | 8.8 | 9.0 |
| Tackifying resin - Staybelite | 30.0 | 38.4 | 29.9 | 27.0 |
| Physical Properties | | | | |
| Tensile Strength | | | | |
| (at Yield) MPa | 0.25 | 0.14 | 0.34 | 1.25 |
| (at break) MPa | 0.20 | 0.04 | 0.21 | 1.22 |
| Elongation | | | | |
| (at yield) % | 669 | 223 | 177 | 1386 |
| (at break) % | 1600 | 1623 | 357 | 1416 |
| Modulus (100%) MPa | 0.14 | 0.11 | 0.30 | 0.31 |

EXAMPLES 6 TO 13

A number of thermoplastic elastomer compositions were prepared, Examples 6 to 10 and 13 being prepared according to the process described in Example 2 and Examples 11 and 12 being prepared according to the process described in Example 1 except that the tackifying resins and waxes were also blended into the composition in the Banbury mixer, rather than in a Brabender mixer.

The components and proportions are given in Table 2 together with the physical properties of the compositions produced. Also given in Table 2 are the maximum Brabender torque values, which correspond to the end of dynamic curing, for Examples 6 to 10 and 13.

The ethylene-vinyl acetate copolymer AC430 is a commercially available material sold by Allied Corporation and is a low molecular weight copolymer containing about 26% of vinyl acetate.

The peroxy curing agent Trigonox C-50-D is sold by Akzo Chemie and comprises 50% by weight of Trigonox C, i.e. the same curing agent as used in Examples 1, and 2 supported on silica. The curing agent was added at the same time as the zinc oxide and stearic acid rather than after the blending of the other components as was the case in Example 1.

Flectol H is a commercially available antioxidant sold by Monsanto.

Hercules A100 is a commercially available hydrocarbon-based tackifying resin sold by Hercules.

AC1702 is a polyethylene wax having a Mettler Drop Point (ASTM D-3104) of 92° C. and is sold by Allied Corporation.

The results illustrate the range of properties which can be achieved by varying the components and proportions.

EXAMPLE 14

A thermoplastic elastomer composition was prepared according to the process described in Example 1 except that the tackifying resins and waxes were also blended into the composition in the Banbury mixer.

The composition comprised the following components:

| Component | Amount (parts by weight) |
|---|---|
| Nitrile Rubber | |
| Breon N36C35 | 10 |
| Breon NBR232 | 30 |
| Ethylene-vinyl acetate | |
| Levapren 700 | 35 |
| UL40028 | 5 |
| UL05540 | 10 |
| AC430 | 10 |
| Stearic acid | 1 |
| Trigonox C-50-D | 3 |
| Zinc Oxide | 5 |
| Flectol H | |
| before curing | 0.5 |
| after curing | 0.5 |
| Polyethylene Wax - AC 1702 | 15 |
| Tackifying resin - Staybelite Ester 10 | 50 |

The thermoplastic elastomer produced had a tensile strength at yield of 0.22 MPa, an elongation at yield of 1019% and at break of more than 1550. The modulus at 100% was 0.11 MPa and the Shore A hardness at 5 seconds was 10.

A test was carried out to assess the performance of the thermoplastic elastomer as a gap filling sealant/adhesive. Two unprimed concrete blocks measuring approximately 75×50×25 mm, separated by two 15 mm thick wooden spacer blocks wrapped with silicone release paper were clamped together to form a gap 15 mm×50 mm×25 mm. The thermoplastic elastomer composition was used in the form of an extruded "rope" of 1 cm diameter and was applied using a commercially available sealant gun at a temperature of 150° C. After filling the gap, the specimens were left to cool to room temperature (about 20° C.) and were then tested using an Instron Tensile Testing Machine.

The results are given in Table 3 together with results for a test in which the blocks of concrete were replaced by unprimed blocks of wood. In each case the joints failed adhesively.

TABLE 2

| Components (amounts, parts by wt) | Example | | | | | | | |
|---|---|---|---|---|---|---|---|---|
| | 6 | 7 | 8 | 9 | 10 | 11 | 12 | 13 |
| Nitrile Rubbers | | | | | | | | |
| N36 C35 | 10 | 10 | 10 | 20 | 15 | 15 | 7.5 | 15 |
| NBR 232 | 30 | 30 | 20 | 20 | 30 | 30 | 30 | 30 |
| EVA COPOLYMERS | | | | | | | | |
| Levapren 700 | — | — | — | — | 55 | 55 | 20 | 41.3 |
| UL 05540 | 60 | 60 | 70 | 60 | — | — | 20 | 13.7 |
| UL 40028 | — | — | — | — | — | — | 7.5 | — |
| AC 430 | — | — | — | — | — | — | 15 | — |
| Zinc Oxide | 5 | 5 | 5 | 5 | 5 | 5 | 5 | 5 |
| Stearic Acid | 1 | 1 | 1 | 1 | 1 | 1 | 1 | 1.3 |
| Trigonox C | — | 1.6 | — | — | — | — | — | — |
| Trigonox C-50-D | 2.5 | — | 2.5 | 2.5 | 2.5 | 3 | 2.5 | 3 |
| Flectol H | — | — | — | — | 0.5 | 0.5 | — | 0.5 |
| Carbon black | — | — | — | — | 0.5 | 0.1 | 0.1 | 0.1 |
| Maximum Brabender Torque (meter-gram) | 430 (151° C.) | 575 (158° C.) | 780 (163° C.) | 825 (161° C.) | 540 (150° C.) | — | — | 570 (149° C.) |
| Added After Curing | | | | | | | | |
| Staybelite Ester 10 Resin | 20 | 20 | 20 | 20 | 30 | 30 | 50 | — |
| Hercules A100 | — | — | — | — | — | — | — | 29 |
| MSW 70 | 10 | — | 10 | 10 | 10 | 10 | 15 | 18 |
| AC 1702 | — | 10 | — | — | — | — | 15 | — |
| Flectol H | — | — | — | — | 0.5 | 0.3 | 1.0 | — |
| Physical Properties | | | | | | | | |
| Tensile Strength (Yield) | — | — | — | — | 0.21 | 0.31 | 0.24 | 0.51 |
| (MPa) (Break) | 2.62 | 3.43 | 5.53 | 4.81 | — | — | 0.11 | — |
| Elongation (Yield) | — | — | — | — | 848 | 766 | 792 | 600 |
| (%) (Break) | 1442 | 1518 | 1648 | 1501 | 1600 | 1600 | 1169 | 1600 |
| Modulus (100%) (MPa) | 0.49 | 0.49 | 0.66 | 0.59 | 0.10 | 0.12 | 0.17 | 0.34 |

TABLE 2-continued

| Components (amounts, parts by wt) | Example | | | | | | | |
|---|---|---|---|---|---|---|---|---|
| | 6 | 7 | 8 | 9 | 10 | 11 | 12 | 13 |
| Shore 'A' Hardness (5 second) | 23 | 25 | 35 | 27 | 8 | 8 | 14 | 21 |

TABLE 3

| Substrate | Instron Cross-head speed (mm/min) | Physical Properties at Yield | | | Elongation at failure (%) | Modulus at 10% (MPa) |
|---|---|---|---|---|---|---|
| | | Load (N) | Stress (MPa) | Strain (%) | | |
| Concrete | 5 | 78 | 0.065 | 13.2 | 88 | 0.566 |
| Concrete | 50 | 182 | 0.145 | 28.5 | 141 | 1.039 |
| Concrete | 500 | 324 | 0.283 | 42.6 | 140 | 1.742 |
| Wood | 500 | 327 | 0.303 | 64.0 | 379 | 1.646 |

EXAMPLE 15

A thermoplastic elastomer composition was prepared as described in Example 2 except that the composition comprised the following components:

| Component | Amount (parts by weight) |
|---|---|
| Nitrile Rubber | |
| Breon N36C35 | 20 |
| Breon NBR232 | 30 |
| Ethylene-acrylic acid copolymer | 50 |
| Stearic acid | 1 |
| Trigonox C-50-D | 2.5 |

The thermoplastic elastomer produced had a tensile strength at break of 2.43 MPa and an elongation at break of 168%. The modulus at 100% was 1.95 MPa and the shore A hardness at 5 seconds was 62.

The ethylene-acrylic acid copolymer used is a commercially available material sold by Dow Chemicals under the trade designation Primacor 5983. The copolymer contains 20% by weight of acrylic acid and has a melt flow index of 500. (PRIMACOR is a trademark).

EXAMPLE 16

A thermoplastic elastomer composition was prepared as described in Example 2 except that the composition comprised the following components:

| Component | Amount (parts by weight) |
|---|---|
| Nitrile Rubber | |
| BREON N36C35 | 15 |
| BREON NBR232 | 30 |
| Ethylene-vinyl acetate copolymer LEVAPREN 700 | 25 |
| Ethylene-vinyl acetate copolymer PRIMACOR 5983 | 30 |
| Stearic acid | 1 |
| Trigonox C-50-D peroxy curing agent | 2.5 |
| Added After Crosslinking | |
| Flextol H | 0.5 |
| Polyethylene Wax - AC 1702 | 10 |
| Tackifying Resin - Stayblite Ester 10 | 30 |

The thermoplastic elastomer produced had a tensile yield strength of 0.71 MPa an elongation at yield of 238% and at break of 373%. The modulus at 100% was 0.57 and the shore A hardness at 5 seconds was 30.

We claim:

1. A process for producing a composition suitable for use as a sealant or adhesive which process comprises curing under dynamic curing conditions a blend comprising:
   (A) a first nitrile rubber which is liquid at 20° C.,
   (B) a second nitrile rubber which is solid at 20° C.,
   (C) a copolymer of ethylene selected from the group consisting of ethylene-vinyl acetate copolymer, hydrolysed or partially hydrolysed ethylene-vinyl acetate copolymer, ethylene-vinyl ether copolymer, ethylene-acrylic acid copolymer and mixtures thereof, and
   (D) a peroxy curing agent,
   the dynamic curing of the nitrile rubbers and the copolymer of ethylene being carried out by mixing the components (A) to (D) at a temperature above the activation temperature of the peroxy curing agent and above the melting temperature of the copolymer of ethylene to produce a thermoplastic elastomer which is then blended with a tackifying resin.

2. A process as claimed in claim 1 in which the nitrile rubbers are butadiene-acrylonitrile rubbers having an acrylonitrile content of from 20–45% by weight.

3. A process as claimed in claim 1 in which the copolymer of ethylene is an ethylene-vinyl acetate copolymer having from 15–80% by weight of vinyl acetate and a melt flow index of from 2 to 600 dg/min.

4. A process as claimed in claim 3 in which the ratio of nitrile rubber to ethylene-vinyl acetate copolymer is from 1:5 to 4:1 parts by weight.

5. A process as claimed in claim 4 in which the ratio of nitrile rubbers to ethylene-vinyl acetate copolymer is from 1:2 to 2:1 parts by weight.

6. A process as claimed in claim 1 in which the tackifying resin comprises 5 to 100 parts by weight per hundred parts of the total weight of the nitrile rubbers and the copolymer of ethylene and is selected from the group consisting of hydrogenated rosins and hydrogenated rosin esters.

7. A process as claimed in claim 11 in which a wax is blended with the thermoplastic elastomer and tackifying resin.

8. A sealant or adhesive composition comprising a tackifying resin and a dynamically cured blend comprising:
   (A) a first nitrile rubber which is liquid at 20° C.,
   (B) a second nitrile rubber which is solid at 20° C.,
   (C) a copolymer of ethylene selected from the group consisting of ethylene-vinyl acetate copolymer, hydrolysed or partially hydrolysed ethylene-vinyl acetate copolymer, ethylene-vinyl ether copolymer, ethylene-acrylic acid copolymer and mixtures thereof, and
   (D) a peroxy curing agent.

9. A sealant or adhesive composition as claimed in claim 8 in which the rubbers are butadiene-acrylonitrile rubbers having an acrylonitrile content of from 20-45% by weight.

10. A sealant or adhesive composition as claimed in claim 8 in which the copolymer of ethylene is an ethylenevinyl acetate copolymer having from 15-80% by weight of vinyl acetate and a melt flow index of 2 to 600 dg/min.

11. A sealant or adhesive composition as claimed in claim 8 in which the ratio of nitrile rubbers to ethylene-vinyl acetate copolymer is from 1:5 to 4:1 parts by weight.

12. A sealant or adhesive composition as claimed in claim 8 in which the ratio of nitrile rubbers to ethylene-vinyl acetate copolymer is from 1:2 to 2:1 parts by weight.

13. A sealant or adhesive composition as claimed in claim 8 in which the tackifying resin comprises 5 to 100 parts by weight per hundred parts of the total weight of the nitrile rubbers and the copolymer of ethylene and is selected from the group consisting of hydrogenated rosins and hydrogenated rosins esters.

14. A sealant or adhesive composition as claimed in claim 8 which also contains a wax.

* * * * *

UNITED STATES PATENT AND TRADEMARK OFFICE
CERTIFICATE OF CORRECTION

PATENT NO. : 4,725,637
DATED : February 16, 1988
INVENTOR(S) : Alan Fernyhough et al.

It is certified that error appears in the above-identified patent and that said Letters Patent is hereby corrected as shown below:

Col. 1, line 42, change "cross-linkage" to --cross-linkable--.

Col. 5, line 42, change "ATM" to --ASTM--.

Col. 9, line 54, change "vinyl acetate" to --acrylic acid--.

Col. 9, line 58, correct the spelling of "Flectol".

Col. 9, line 60, correct the spelling of "staybelite".

Claim 10, line 3, insert a hyphen between "ethylene" and "vinyl acetate".

Signed and Sealed this

Fifth Day of July, 1988

Attest:

DONALD J. QUIGG

Attesting Officer

Commissioner of Patents and Trademarks